(12) United States Patent
Wu et al.

(10) Patent No.: US 12,724,841 B2
(45) Date of Patent: Sep. 1, 2026

(54) TWO-DIMENSIONAL BARCODE-BASED GYM EQUIPMENT INFORMATION SYSTEM

(71) Applicant: Vonrang International Corporation, Taipei City (TW)

(72) Inventors: Chun-Yi Wu, Taipei City (TW); Wayne Tsu-Wei Liu, Taipei City (TW); Jue-An Liu, Taipei City (TW)

(73) Assignee: VONRANG INTERNATIONAL CORPORATION, Taipei City (TW)

( * ) Notice: Subject to any disclaimer, the term of this patent is extended or adjusted under 35 U.S.C. 154(b) by 0 days.

(21) Appl. No.: 19/084,273

(22) Filed: Mar. 19, 2025

(65) Prior Publication Data

US 2026/0211965 A1 Jul. 23, 2026

(30) Foreign Application Priority Data

Jan. 22, 2025 (TW) ................................ 114102769

(51) Int. Cl.

| | |
|---|---|
| ***G06F 16/90*** | (2019.01) |
| ***G06F 16/955*** | (2019.01) |
| ***G06K 19/06*** | (2006.01) |

(52) U.S. Cl.

CPC ... *G06F 16/9554* (2019.01); *G06K 19/06037* (2013.01)

(58) Field of Classification Search

CPC ...................... G06F 16/9554; G06K 19/06037

See application file for complete search history.

(56) References Cited

U.S. PATENT DOCUMENTS

| | | | | |
|---|---|---|---|---|
| 9,280,148 | B1 * | 3/2016 | Colett .................... | G06K 19/00 |
| 2013/0071029 | A1 * | 3/2013 | Terwilliger .......... | G06K 7/1095 345/443 |
| 2014/0166739 | A1 * | 6/2014 | Savage ............... | G06F 16/9554 235/494 |
| 2023/0191197 | A1 * | 6/2023 | Ashby .................... | G16H 40/63 482/8 |

FOREIGN PATENT DOCUMENTS

| | | | |
|---|---|---|---|
| KR | 20220133747 A | * 10/2022 | ......... H04L 63/0428 |

* cited by examiner

*Primary Examiner* — Kristopher Andersen

(74) *Attorney, Agent, or Firm* — Bay State IP, LLC

(57) ABSTRACT

Disclosed is a two-dimensional barcode-based gym equipment information system, comprising: a plurality of gym equipment, a plurality of two-dimensional barcode labels, and a web server. The web server hosts a plurality of gym equipment information web pages, each storing gym equipment information about the corresponding gym equipment. The gym equipment information web pages are respectively linked to the two-dimensional barcode labels. A user can scan the two-dimensional barcode label on the gym equipment using a mobile device to access the corresponding gym equipment information web page and conveniently obtain the corresponding gym equipment information.

8 Claims, 3 Drawing Sheets

TWO-DIMENSIONAL BARCODE-BASED GYM EQUIPMENT INFORMATION SYSTEM

CROSS REFERENCE TO RELATED APPLICATION

This application claims the benefit of and takes priority from Taiwan Patent Application No. 114102769 filed on Jan. 22, 2025, the contents of which are herein incorporated by reference.

FIELD OF THE INVENTION

The present invention relates to gym equipment, and more particularly relates to a two-dimensional barcode-based gym equipment information system.

BACKGROUND OF THE INVENTION

Gym equipment typically comes with a printed user manual. The user manual provides basic operating instructions, step-by-step guidance for assembly and disassembly, product specifications, and other related product information about the gym equipment. However, users often fail to properly keep these printed user manuals, leading to difficulties when they need to refer to information. In addition, if users operate, assemble or disassemble the gym equipment in the wrong way, they may risk not only damaging the gym equipment but also causing injury.

SUMMARY OF THE INVENTION

Accordingly, one objective of the present invention is to provide a two-dimensional barcode-based gym equipment information system so that a user can quickly and conveniently obtain relevant information about the gym equipment via a mobile device.

In order to overcome the technical problems in prior art, the present invention provides a two-dimensional barcode-based gym equipment information system, comprising: a plurality of gym equipment; a plurality of two-dimensional barcode labels, attached respectively to the plurality of gym equipment; and a web server, which hosts a plurality of gym equipment information web pages, each storing gym equipment information about the corresponding gym equipment, wherein the gym equipment information web pages are respectively linked to the two-dimensional barcode labels, allowing a user to scan the two-dimensional barcode label using a mobile device to access the corresponding gym equipment information web page and obtain the corresponding gym equipment information, wherein the gym equipment information includes product information of the gym equipment, usage instructional information of the gym equipment, maintenance instructional information of the gym equipment, and fitness training program information of the gym equipment.

In one embodiment of the present invention, the two-dimensional barcode-based gym equipment information system is provided, wherein the usage instructional information of the gym equipment includes demonstration videos, images or text for usage instructions of the gym equipment.

In one embodiment of the present invention, the two-dimensional barcode-based gym equipment information system is provided, wherein the maintenance instructional information of the gym equipment includes demonstration videos, images or text for maintenance instructions of the gym equipment.

In one embodiment of the present invention, the two-dimensional barcode-based gym equipment information system is provided, wherein the gym equipment information further includes product registration information for warranty or after-sales service.

In one embodiment of the present invention, the two-dimensional barcode-based gym equipment information system is provided, wherein the product information of the gym equipment includes product specification information.

In one embodiment of the present invention, the two-dimensional barcode-based gym equipment information system is provided, wherein the gym equipment is a dumbbell.

In one embodiment of the present invention, the two-dimensional barcode-based gym equipment information system is provided, wherein the two-dimensional barcode labels are adhesive components affixed to the outer surface of the gym equipment.

In one embodiment of the present invention, the two-dimensional barcode-based gym equipment information system is provided, wherein label information of the two-dimensional barcode labels includes unique identification information of the gym equipment.

In one embodiment of the present invention, the two-dimensional barcode-based gym equipment information system is provided, wherein the two-dimensional barcode labels are Quick Response Code labels.

With the technical means adopted by the two-dimensional barcode-based gym equipment information system of the present invention, it enables a user to scan the two-dimensional barcode label on the gym equipment using a mobile device, thereby accessing the gym equipment information web page corresponding to the gym equipment. The gym equipment information web page can provide relevant information about the gym equipment in form of pictures, text, or even videos, allowing the user to conveniently obtain information and assisting the user in operating or disassembling the gym equipment in a correct way. In addition, the present invention can also assist the user in learning and trying unfamiliar gym equipment, thereby improving usage safety and user experience.

DETAILED DESCRIPTION OF THE PREFERRED EMBODIMENTS

Figure 1A:
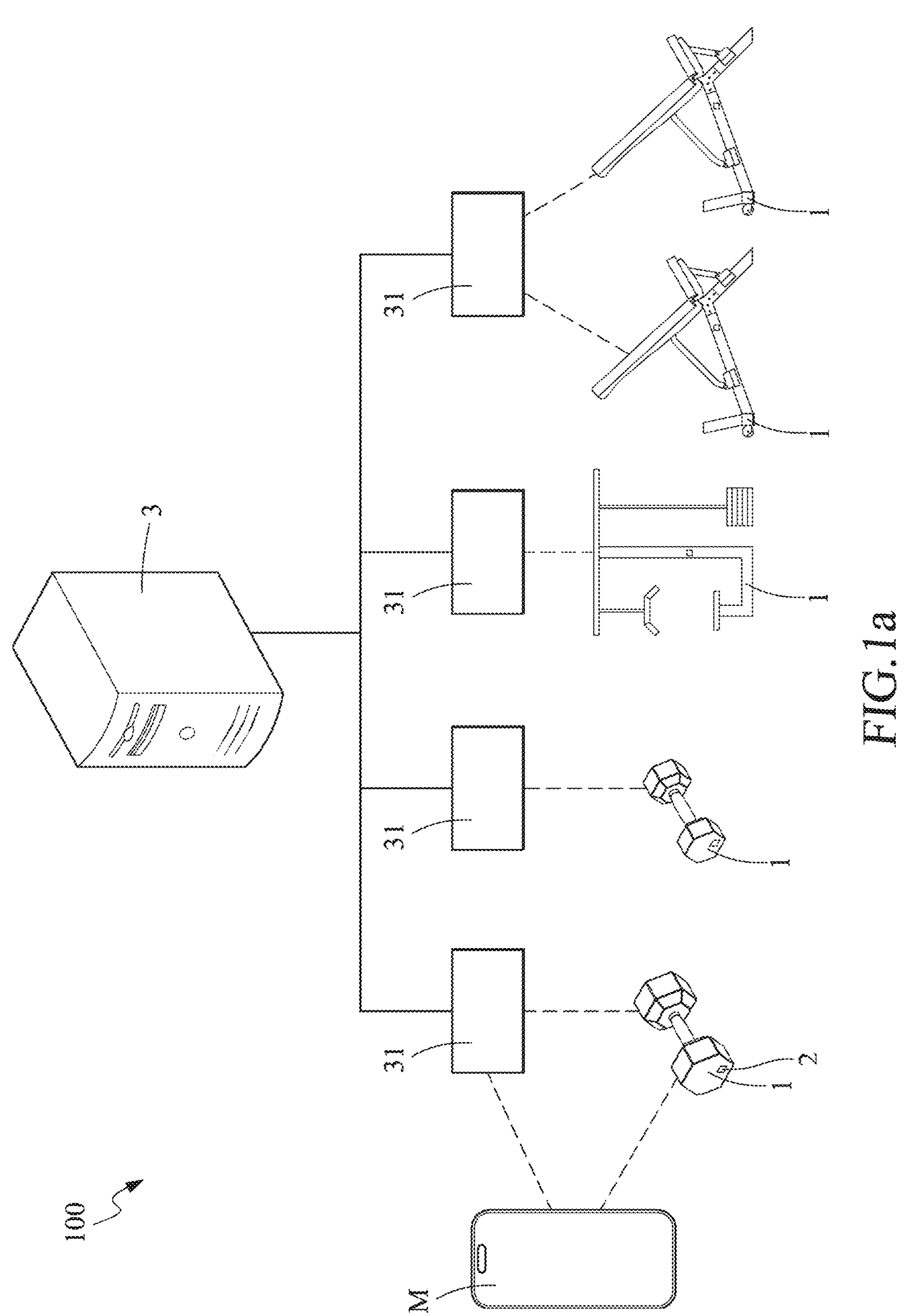
FIG. 1*a* is a schematic drawing illustrating the architecture of a two-dimensional barcode-based gym equipment information system according to an embodiment of the present invention.

The preferred embodiments of the present invention are described in detail below with reference to FIG. 1*a* to FIG.

3. The description is used for explaining the embodiments of the present invention only, but not for limiting the scope of the claims.

According to one embodiment of the present invention, a two-dimensional barcode-based gym equipment information system 100 includes: a plurality of gym equipment 1, a plurality of two-dimensional barcode labels 2, and a web server 3.

In this embodiment, the gym equipment 1 includes dumbbells, a pulley machine, and bench press chairs, wherein the dumbbells have different specifications. In other embodiments, the gym equipment 1 may be multiple pieces of the same type of equipment with the same specifications, multiple pieces of the same type of equipment with different specifications, different types of equipment, or a combination of the above. In addition, the gym equipment 1 may be the aforementioned weight training equipment, or it may be aerobic equipment such as treadmills and rowing machines.

The two-dimensional barcode labels 2 are respectively attached to the plurality of gym equipment 1. In this embodiment, the two-dimensional barcode labels 2 are adhesive components affixed to the outer surface of the gym equipment 1. In other embodiments, the two-dimensional barcode labels 2 may also be formed by printing, anodizing, or other methods that yield a surface with color differences sufficient for recognition. The two-dimensional barcode labels 2 are preferably disposed on the metal parts of the gym equipment 1 other than handle portions, such as counterweights and frames, to avoid wear or interference during use.

Figure 1B:
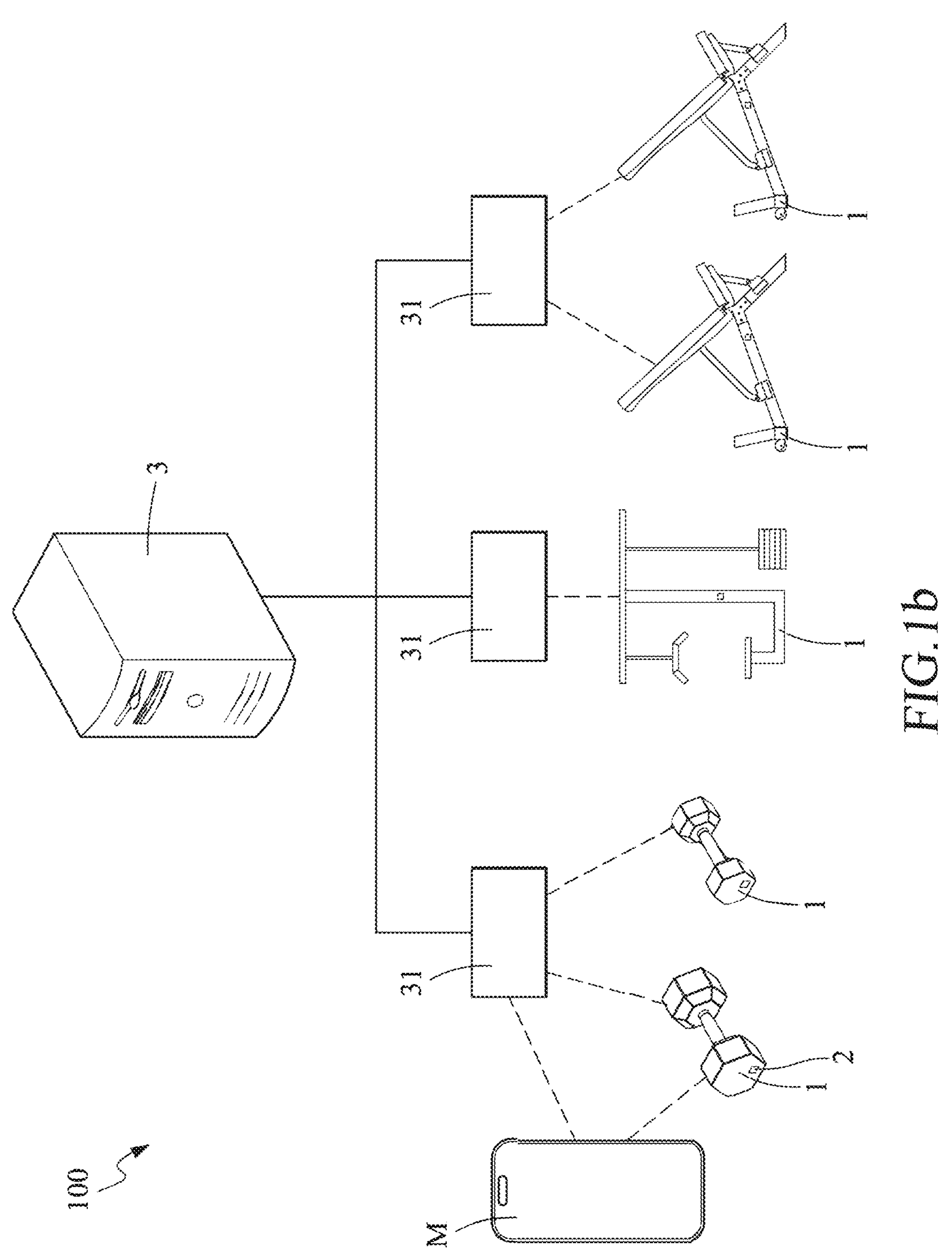
FIG. 1*b* is a schematic drawing illustrating the architecture of a two-dimensional barcode-based gym equipment information system according to another embodiment of the present invention.

In this embodiment, the two-dimensional barcode labels 2 are Quick Response Code (QR Code) labels. The label information of the two-dimensional barcode labels 2 includes the URL information of the gym equipment information web page 31. Specifically, the two-dimensional barcode labels 2 of the gym equipment 1 of the same specification correspond to the same gym equipment information web page 31. In this embodiment, as shown in FIG. 1*a*, one gym equipment information web page 31 corresponds to one specification of gym equipment 1. In other embodiments, as shown in FIG. 1*b*, one gym equipment information web page 31 may correspond to the gym equipment 1 with different specifications of the same type.

Figures 2, 3:
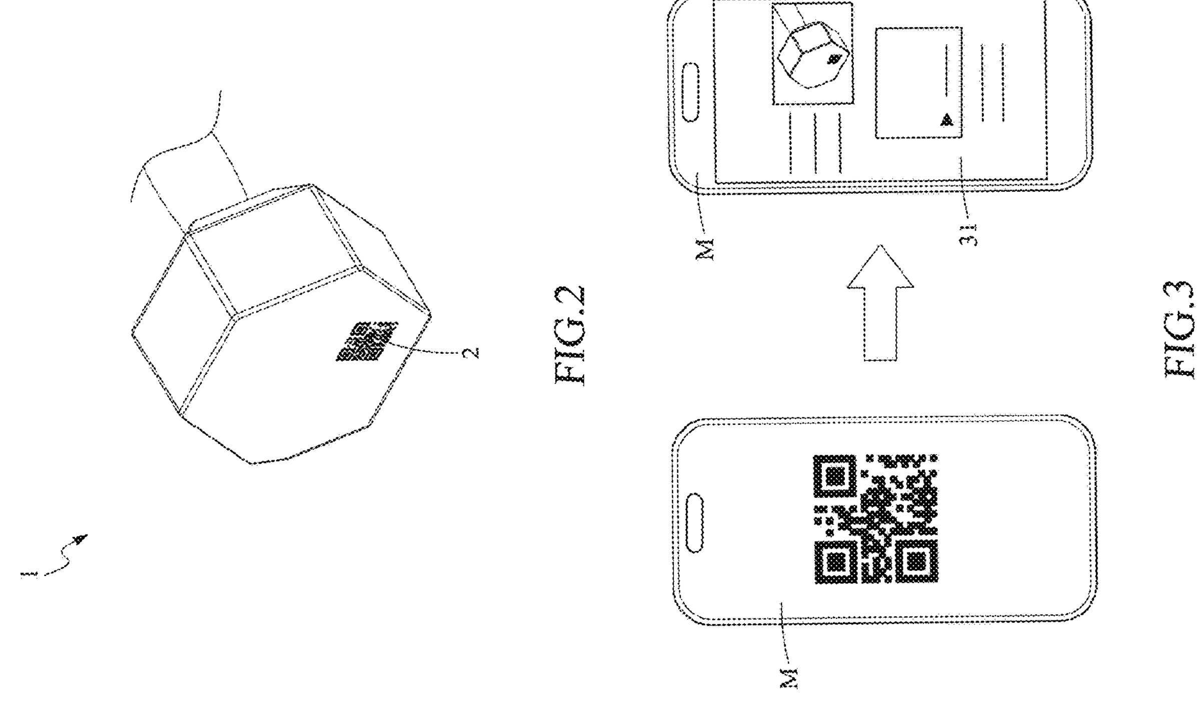
FIG. 2 is a schematic drawing illustrating gym equipment of the two-dimensional barcode-based gym equipment information system according to the embodiment of the present invention.
FIG. 3 is a schematic drawing illustrating a mobile device accessing gym equipment information via the two-dimensional barcode-based gym equipment information system according to the embodiment of the present invention.

The web server 3 hosts a plurality of gym equipment information web pages 31, each storing the gym equipment information of the plurality of gym equipment 1. The plurality of gym equipment information web pages 31 are respectively linked to the plurality of two-dimensional barcode labels 2. As shown in FIG. 3, a user can scan the two-dimensional barcode label 2 using a mobile device M to access the gym equipment information web page 31 corresponding to the gym equipment 1 and obtain the corresponding gym equipment information.

The gym equipment information includes product information of the gym equipment 1, usage instructional information of the gym equipment 1, maintenance instructional information of the gym equipment 1, and fitness training program information of the gym equipment 1.

Specifically, the usage instructional information of the gym equipment 1 includes demonstration videos, images or text for usage instructions of the gym equipment 1, allowing the user to learn the correct posture and usage method from it. Through videos, dynamic content that cannot be expressed in printed user manuals can be presented, improving the instructional effectiveness.

The product information of the gym equipment 1 includes the product specification information of the gym equipment 1, such as name, dimensions, weight, range of motion, telescopic length, adjustable weight and materials, allowing the user to learn about the product specifications and characteristics of the gym equipment 1.

The maintenance instructional information of the gym equipment 1 includes demonstration videos, images or text for maintenance instructions of the gym equipment 1, allowing users to learn the correct procedures for assembly and disassembly and maintenance, thereby extending the service life of the gym equipment 1.

The fitness training program information of the gym equipment 1 includes demonstration videos, images or text of the fitness training program of the gym equipment, allowing users to learn about the various fitness training programs applicable to the gym equipment 1 and assisting them in developing effective training plans.

In another embodiment, the gym equipment information further includes product registration information for warranty or after-sales service of the gym equipment 1, facilitating product registration and after-sales service inquiries for the user.

According to another embodiment of the present invention, in the two-dimensional barcode-based gym equipment information system 100, the label information of the two-dimensional barcode label 2 includes unique identification information of the gym equipment 1, that is, the information of the two-dimensional barcode labels 2 on different gym equipment 1 is distinct. The unique identification information can be the product serial number of the gym equipment 1. In this embodiment, the unique identification information is a query string appended to a base URL, enabling the web server 3 to generate corresponding web page content based on the unique identification information. For example, the web server 3 generates product registration web page content for warranty or after-sales service corresponding to the product serial number.

Therefore, the two-dimensional barcode-based gym equipment information system 100 of the present invention enables a user to scan the two-dimensional barcode label 2 on the gym equipment 1 using the mobile device M, thereby accessing the gym equipment information web page 31 corresponding to the gym equipment 1. The gym equipment information web page 31 can provide relevant information about the gym equipment 1 in form of pictures, text, or even videos, allowing the user to conveniently obtain information and assisting the user in operating or disassembling the gym equipment 1 in a correct way. In addition, the present invention can also assist users in learning and trying unfamiliar gym equipment 1, improving usage safety and user experience.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A two-dimensional barcode-based gym equipment information system, comprising:

a plurality of gym equipment;

a plurality of two-dimensional barcode labels, attached respectively to the gym equipment; and a web server, which hosts a plurality of gym equipment information web pages, each storing gym equipment information about the corresponding gym equipment, wherein the gym equipment information web pages are respectively linked to the two-dimensional barcode labels, allowing a user to scan the two-dimensional barcode label using a mobile device to access the corresponding gym equipment information web page and obtain the corresponding gym equipment information, wherein the gym equipment information includes:

product information of the gym equipment, the product information including produce specification information comprising a name and at least one of dimensions, weight, range of motion, telescopic length, adjustable weight, and materials of gym equipment;

usage instructional information of the gym equipment;

maintenance instructional information of the gym equipment, the maintenance instructional information comprising procedures assembling, disassembling and maintaining of the gym equipment; and fitness training program information of the gym equipment, the fitness training program information comprising fitness training programs applicable to the gym equipment.

2. The two-dimensional barcode-based gym equipment information system as claimed in claim 1, wherein the usage instructional information of the gym equipment includes demonstration videos, images or text for usage instructions of the gym equipment.

3. The two-dimensional barcode-based gym equipment information system as claimed in claim 1, wherein the maintenance instructional information of the gym equipment includes demonstration videos, images or text for maintenance instructions of the gym equipment.

4. The two-dimensional barcode-based gym equipment information system as claimed in claim 1, wherein the gym equipment information further includes product registration information for warranty or after-sales service.

5. The two-dimensional barcode-based gym equipment information system as claimed in claim 4, wherein label information of the two-dimensional barcode labels includes unique identification information of the gym equipment.

6. The two-dimensional barcode-based gym equipment information system as claimed in claim 1, wherein the gym equipment is a dumbbell.

7. The two-dimensional barcode-based gym equipment information system as claimed in claim 1, wherein the two-dimensional barcode labels are adhesive components affixed to the outer surface of the gym equipment.

8. The two-dimensional barcode-based gym equipment information system as claimed in claim 1, wherein the two-dimensional barcode labels are Quick Response Code labels.

* * * * *